Fig. 2

INVENTORS
Robert J. Stava, deceased,
by Eleanore G. Stava, Executrix,
William F. Schneeker, and
BY Oswald C. Hollstein
Bates, Teare & McKean
Attorneys Aug. 23, 1960 R. J. STAVA ET AL 2,950,394
ROTATIONAL THERAPY X-RAY METHOD AND APPARATUS
Filed Feb. 17, 1954 9 Sheets-Sheet 4

INVENTORS
Robert J. Stava, deceased,
by Eleanore G. Stava, Executrix,
William F. Schneerer and
BY Oswald C. Hollstein
Bates, Teare & McBean
Attorneys

Aug. 23, 1960 R. J. STAVA ET AL 2,950,394
ROTATIONAL THERAPY X-RAY METHOD AND APPARATUS
Filed Feb. 17, 1954 9 Sheets-Sheet 8

INVENTORS
Robert J. Stava, deceased,
by Eleanore G. Stava, Executrix,
William F. Schneerer & Oswald C. Hollstein
BY Bates, Teare & McBean, Attorneys Aug. 23, 1960 R. J. STAVA ET AL 2,950,394
ROTATIONAL THERAPY X-RAY METHOD AND APPARATUS
Filed Feb. 17, 1954 9 Sheets-Sheet 9

INVENTOR.
Robert J. Stava, deceased,
by Eleanore G. Stava, Executrix,
William F. Schneerer & Oswald C. Hollstein
BY Pater, Teare & McKeen, Attorneys ized Aug. 23, 1960

2,950,394

ROTATIONAL THERAPY X-RAY METHOD AND APPARATUS

Robert J. Stava, deceased, late of University Heights, Ohio, by Eleanore G. Stava, executrix, University Heights, William F. Schneerer, Cleveland Heights, and Oswald C. Hollstein, Cleveland, Ohio, assignors to Picker X-Ray Corporation, Waite Mfg. Div. Inc., Cleveland, Ohio, a corporation of Ohio Filed Feb. 17, 1954, Ser. No. 410,868

34 Claims. (Cl. 250—92)

This invention relates to an improved method and apparatus of X-ray therapy and more particularly relates to an arrangement for subjecting an object of treatment to a moving beam of X-rays.

In the treatment of cancers, tumors and the like, it is the aim of the X-ray therapist to deliver a lethal dose of X-ray radiation to the tumor without damaging the surrounding healthy tissues of the patient that may be in the path of the radiation beam. It has been determined that the amount of X-ray radiation which ultimately reaches the tumor is only a small part of the radiation which the healthy tissue can tolerate before damage occurs. This is due to absorption of the X-ray radiation by the healthy tissue in the path of the beam and it has been determined that in the majority of cases, such loss may be of the order of 70% or more. Since a lethal tumor dose is in the range of 110% to 130% of the healthy tissue tolerance dose, the loss by absorption in the healthy tissue is a significant factor in the design and technique of X-ray treatment.

Such absorption by healthy tissue of X-radiations can be reduced without sacrificing the required dosage at the tumor by subjecting the tumor to treatment from different portals, that is, by changing the direction of the beam of X-rays, whereby the X-ray dose received by the surrounding healthy tissue from each such portal is below the tissue tolerance dose, and the sum of the dosages received by the tumor from the different portals is of the required lethal magnitude to accomplish the therapeutic objective.

One arrangement for accomplishing such "crossfire" treatment embodies equipment wherein the subject is rotated so that a collimated beam of X-radiation will pass at all times through the center of the tumor. This arrangement has certain inherent disadvantages in that the patient can slump in his skin or otherwise become displaced relative to the beam requiring constant fluoroscopic checking and adjustment of the X-ray equipment to maintain the beam centered on the tumor during treatment.

Accordingly, it is a principal object of this invention to provide a method and apparatus which will fix the patient and rotate the X-ray beam about the patient with the object of treatment as the fulcrum of rotation.

Another object of this invention relates to the simplification of X-ray treatment by establishing and maintaining a predetermined relationship between an object of treatment and a rotating X-ray beam which does not require checking an adjustment during the treatment.

A further object of this invention relates to improving the accuracy and safety of X-ray treatment by restricting the X-ray absorption of healthy tissue around an object of treatment to a predetermined tolerance dose without sacrificing the lethal dose required at the object.

Briefly, in accordance with this invention, an X-ray tube is mounted on a support for rotation on an axis through the tube with the focal spot of the tube being at one extremity of such axis and arranged to direct a collimated X-ray beam in a direction normal to the axis. The support is coupled to a suitable vertical frame through a counter-balance for effortless straight line horizontal and vertical travel on the frame. The coupling includes an arm which rotates about a fixed point at the center of the horizontal and vertical travel of the tube support so that the entire assembly can be rotated in a vertical plane with the collimated X-ray beam directed at all times towards an object of treatment fixed at a predetermined fulcrum in the circular path of the focal point of the X-ray tube. In its preferred form, the rotating arm is motor driven through remotely controlled magnetic clutches which permit starting and stopping of the entire assembly at any point in its circular path, and the motor may be energized in synchronism with the energizing circuits of the X-ray tube so that the requisite dosage may be automatically obtained for a predetermined cycle of treatment. The apparatus includes a number of protective and safety features for the drive system and includes suitable magnetic locks for fixing the various operative elements in predetermined physical relation to each other for a selected mode of treatment. The equipment is so arranged that the tube assembly can be disengaged from the rotating drive for independent movement relative to its support and in the circular path of travel, thereby permitting its use for conventional X-ray therapy as well as the objective rotational therapy.

Figures 1, 8:
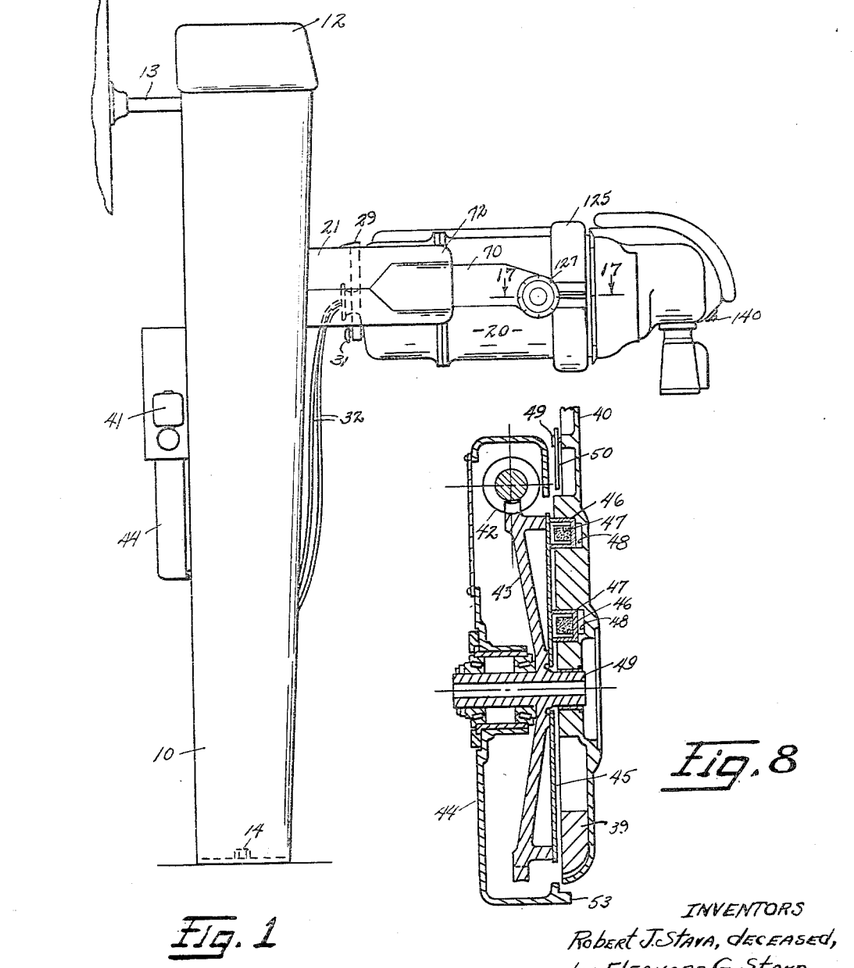
Fig. 1 is a side view of the frame and tube head assembly.
Fig. 8 is an expanded sectional view of the clutch and drive mechanism.
Figure 2:
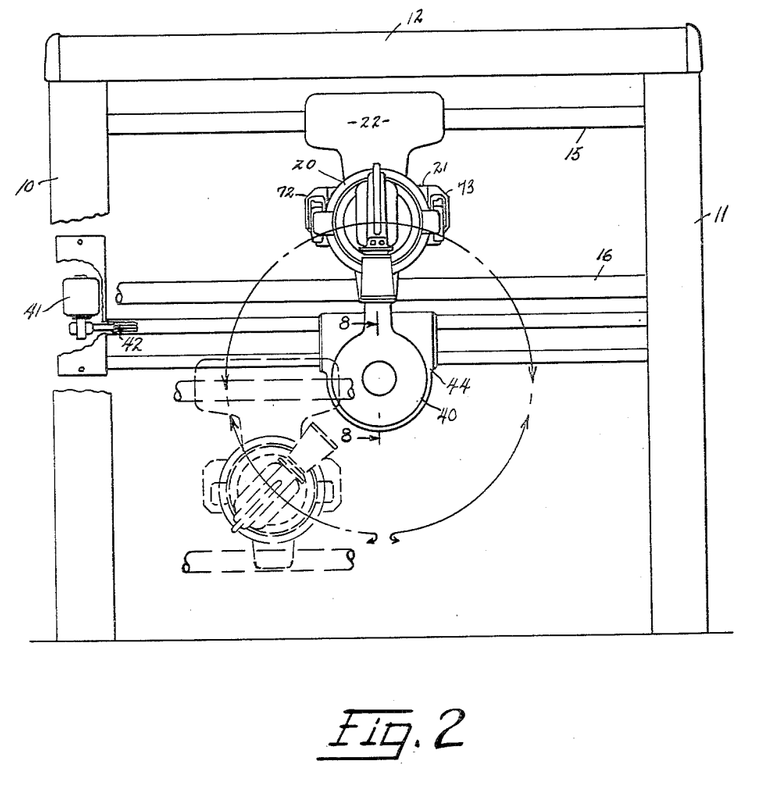
Fig. 2 is a front view of the frame and tube head assembly illustrating in dotted lines a displaced momentary position for the tube head assembly in its circular path.

Referring now and more particularly to Figs. 1 and 2 of the drawings, there is shown a stand in the form of an overhead frame having spaced vertical supports 10 and 11 interconnected through a cross head 12. The overhead frame may be fixed in position in a desired location by means of a connecting bar 13 which couples the upper portion of the frame to a wall and by suitable bolts 14 extending through foot flanges at the base of the vertical supports. A pair of tubular guides 15 and 16 are horizontally disposed between the vertical supports in fixed vertically spaced relation to each other with their opposite ends intended for vertical movement along the adjacent vertical frame supports.

In its preferred form, the X-ray tube is disposed in a cylindrical housing 20 in such manner that the cylindrical axis of the housing and the longitudinal axis of the X-ray tube are in alignment with each other, so that when properly mounted a collimated X-ray beam will emerge at right angles to the axis of the housing adjacent the front end. The housing 20 is mounted for rotation about its cylindrical axis in an annular collar to form a tube head assembly which is shown in greater detail in Figs. 15 to 19 and which is intended to be mounted on the overhead frame through a composite yoke assembly including a supporting and a mounting yoke. The supporting yoke 21 provides a trunnion support for the tube housing 20 which permits independent tilting of the housing relative to the yoke, as will be hereinafter more fully described, and the mounting yoke 22 serves as a movable carriage mounting for the supporting yoke 21 and the tube housing on the horizontally disposed tubular guides 15 and 16 of the frame.

Figures 3, 4, 5:
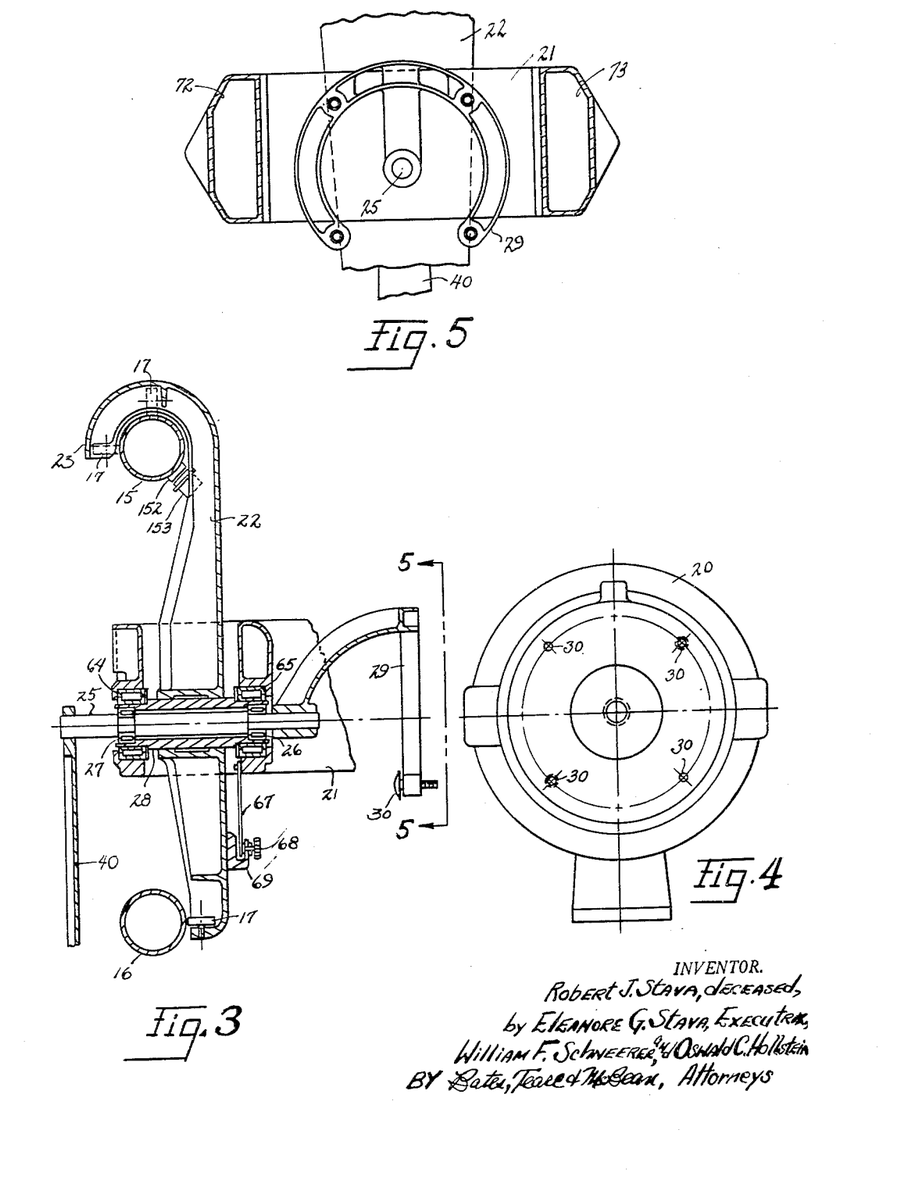
Fig. 3 is a sectional view through the mounting yoke illustrating the manner in which it is coupled to the frame and the rotation drive.
Fig. 4 is a rear view of the tube housing.
Fig. 5 is a partial view taken along the line 5—5 in Fig. 3 to illustrate a tube housing retaining ring and its disposition relative to mounting and supporting yokes.

Referring now to Fig. 3 of the drawings, it will be seen that the mounting yoke 22 has downwardly hooked extremities 23 at its upper end which are adapted to overlap the upper tubular guide 15. The lower extremity depends freely therefrom and extends to a position adjacent the lower tubular guide 16. The entire mounting yoke assembly is readily movable in a horizontal direction along the tubular guides by providing suitable rollers 17 within the hooked extremities and the lower extremities of the yoke, each of which track along the corresponding guide so that the mounting yoke, along with the supporting yoke 21 and X-ray tube housing 20 can be positioned horizontally along the guides to any position between the vertical frame supports.

The entire tube head assembly can be readily coupled to the mounting yoke 22 by means of a coupling shaft 25 which may be attached to the rear end of the tube housing 20 in such manner that the axis of the shaft 25 is in alignment with the cylindrical axis of the housing 20 and the X-ray tube. The shaft 25 passes through suitable aligned bearings 26 and 27 in the supporting yoke 21 and through an aligned bearing sleeve 28 in the mounting yoke 22 so that when coupled the center line of the shaft and the tube housing can be considered as a continuous horizontal member with the focal spot of the X-ray beam at the outer extremity. The rear end of the tube housing 20 is coupled to the shaft 25 through a segmental ring 29 which is keyed to the shaft. A segment of approximately 100° is cut away from the ring 29 to permit clearance for electrical cables and water lines emerging from the tube housing. It will be seen in Fig. 4 that the rear end of the tube housing 20 has circumferentially spaced threaded apertures 30 which can be aligned with suitable locking bolts 31 carried by the segmental ring 29. The shaft 25 and its segmental ring 29 may thus be disengaged from the tube head assembly and also from the rotating drive in a manner which will hereinafter be more fully described.

Figures 6, 7:
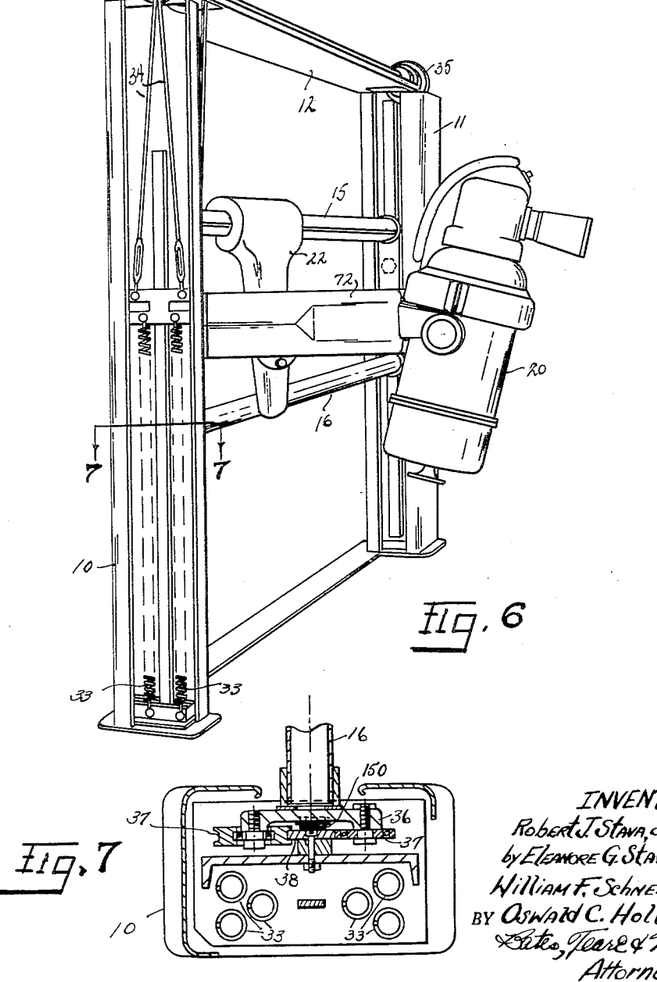
Fig. 6 is a perspective view of the apparatus with the interior of one frame support exposed to illustrate the counter-balance mounting for the tube head assembly on the frame.
Fig. 7 is a sectional view taken along the lines 7—7 in Fig. 6.

The entire tube head assembly when mounted on the tubular guides 15 and 16 is counterbalanced against free vertical movement as best shown in Figs. 6 and 7 of the drawings. The counterbalancing system may take any conventional form but, in the preferred form illustrated, utilizes coiled springs 33, two of which are shown anchored at the base of the vertical frame supports and coupled at the top to cables 34 which overrun suitable drums 35 mounted for free rotation on the crosshead 12. The other cable extremities are coupled to carriages, such as the one shown at 36, which are fixed respectively to the adjacent ends of the tubular guides 15 and 16. Spaced rollers 37 are provided for guiding the carriage 36 along a magnetically susceptible vertical track 38 within the corresponding frame support.

It is readily apparent by reference to the foregoing description and drawings that the entire tube head assembly and composite yoke mounting can be positioned horizontally and vertically within the supporting frame. The mounting yoke can be moved horizontally along the tubular guides which are capable of vertical movement along the vertical supports. Such an arrangement, coupled with independent movements of the tube head relative to its supporting yoke, permits an operator to direct an X-ray beam at an object of examination from any direction or angle within the limited confines of the supporting frame. When the tube head assembly and yoke mounting are coupled to an arm 40 which is capable of rotation about a fixed point within the confines of the overhead frame, it is possible to guide the entire assembly so that the focal spot of the X-ray beam travels in a vertical plane along a circular path within the confines of the frame. This is best illustrated in Fig. 2 of the drawings where the tube head assembly is shown positioned centrally between the vertical supports and at the upper end thereof for movement in a circular path defined by the arrows with one such rotated position shown in dotted lines.

The rotation arm 40 for moving the tube head assembly and horizontal guide carriages is driven through a motor powered worm and worm gear assembly which may be selectively disengaged by means of suitable magnetic clutches coacting between the gear and the rotation arm. As best shown in Figs. 2 and 8 of the drawings, the output shaft of a variable speed motor 41 drives a worm 42 and a worm gear 43. The worm gear drive is supported within a housing 44 at the rear of the overhead frame for rotation on a fixed axis which is approximately coincident with the center of the circular path of travel. Fastened to the forward side of the gear 43 is a magnetically susceptible clutch plate 45, of steel or the like, which extends outside the gear housing, for coaction with the magnetic pole pieces 46 of suitable magnetic clutches carried by an adjacent portion of the rotation arm 40. Each magnetic clutch has a coil 47 disposed in a recess 48 in one face of the rotation arm and the magnetic path of each coil is confined to the corresponding magnetic pole piece in which the coil is seated. The rotation arm 40 is rotatably mounted on a pivot stud 49 which protrudes from the center of the gear 43 and is free to swing about this stud except when the magnetic clutches are energized to clutch the arm 40 to the clutch plate 45 and worm gear drive. The magnetic clutches are rendered operative by energizing the coils 47 to magnetize the corresponding pole piece extremities which will be attracted to the clutch plate 45 to effectively lock the rotation arm 40 for unitary movement with the worm gear drive.

Figure 9:
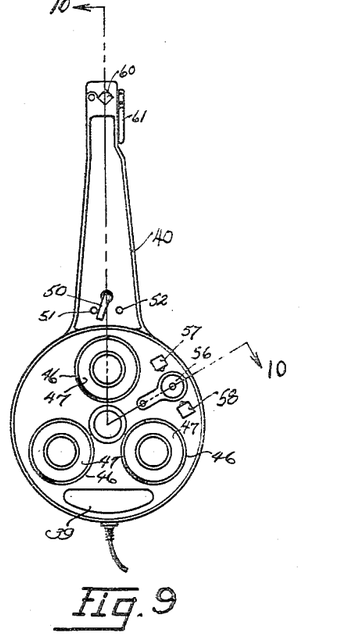
Fig. 9 illustrates the rotation arm and clutch assembly.

Fig. 9 is a rear view of the rotation arm illustrating the disposition of three such electro-magnetic clutches about the rotation axis and a balancing counterweight 39 at its lower extremity. The magnetic clutches may be remotely controlled to permit engagement or disengagement of the motor drive for free adjustment of the X-ray tube assembly to any starting point in its circular path, as will be hereinafter more fully described.

Referring now to Figs. 8 and 9 in conjunction with each other, there is shown a rotation stop in the form of a lever arm 50 pivoted at one end to the rotation arm 40 in radially spaced relation from the axis of rotation and having its free extremity limited in pivotal movement by a pair of circumferentially spaced lugs 51 and 52 extending from the arm. Thus, when the arm 40 is rotated from any starting point to a position where its extremity depends downwardly, its further rotation is prevented when the pivoted lever arm 50 engages a projection 53 at the bottom of the gear drive housing 44. This stopping coaction occurs when the arm 40 is rotated in either direction to a depending position. The circumferentially spaced lugs 51 and 52 permit sufficient play in the lever stop 50 as it engages the projection 53 on the housing to overcome the structural thickness of the stop and lever and to permit the arm 40 to make a full 360° traverse in its circular path.

Figure 10:
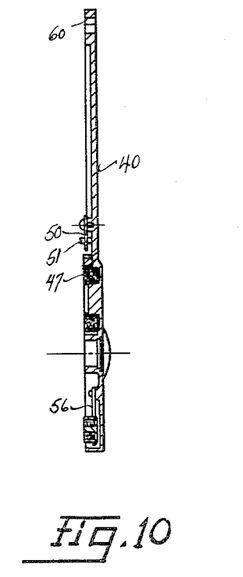
Fig. 10 is a sectional view taken along the lines 10—10 in Fig. 9.

There is also shown in Figs. 9 and 10 a protective device for turning off the X-ray radiation and the motor drive when and if the magnetic clutch should slip, as for example when the moving tube assembly hits an obstruction in its path of travel. The protective device includes a small magnet 56 pivotally mounted to the rotation arm 40 adjacent the clutch magnets for magnetic coaction against the clutch plate 45 in such manner that it can swing in pendulum fashion against either one of a pair of protective limit switches 57 or 58 to open the remotely controlled magnetic clutch energizing circuit when the arm 40 hits an obstruction to free the rotation arm 40 from the motor drive. The energization and electrical coaction of the protective device in the drive and clutch circuit will be hereinafter more fully described in conjunction with Fig. 20 of the drawings.

Figure 11:
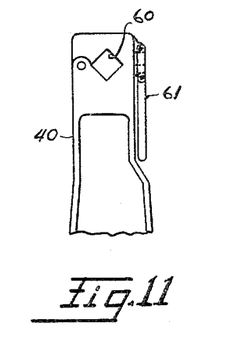
Figs. 11 and 12 are front and side views respectively of the driven extremity of the rotation arm.
Figure 12:
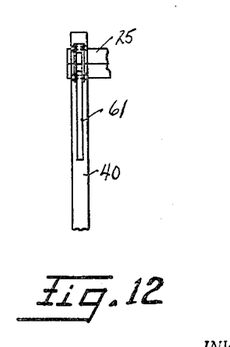

The rotation arm 40 is drivingly coupled to the connecting shaft 25 by providing a square end at the extremity of the shaft which projects through the supporting and mounting yokes. As best shown in Figs. 11 and 12 of the drawings, the extremity of the rotation arm 40 is also provided with a split square hole 60 which can be opened to engage the square end of the shaft 25. The shaft 25 is then locked to the rotation arm 40 by means of a suitable latch 61 which closes the split square hole 60 of the rotation arm 40 over the square end of the shaft 25. Thus, in order to condition the apparatus for driven rotation therapy it is only necessary to couple the square end of the shaft 25 to the rotation arm 40 and connect the retaining ring 29 at the other extremity of the shaft to the rear end of the tube housing 20.

As previously noted, the tube housing 20 is also mounted for independent movement in the supporting yoke 21 which, for most purposes, is fixed to the mounting yoke 22 for guidance along the tubular guides 15 and 16. Actually, provision is made for tilting the supporting yoke 21 about the axis of the shaft 25 within a limited angle of approximately 30° in a vertical plane to permit utilization of the apparatus within a more confined space. Thus, the supporting yoke 21 is mounted on bearings 64 and 65 which in turn are seated on the sleeve 28 extending through the mounting yoke 22 and encircling the shaft 25 (Fig. 3). A locking plate 67 depends from the supporting yoke for selective locking engagement against an indexing screw stop 68 which is threaded into a bracket 69 carried by the lower extremity of the mounting yoke 22. The plate 67 is provided with an indexing hole to receive the indexing stop when the supporting yoke 21 is positioned horizontally for normal use. Suitable stops, not shown, may be provided for coaction with the stop 68 to limit the angular tilt of the supporting yoke 21.

In its preferred form, the entire tube housing assembly is coupled to the supporting yoke 21 in a manner which will permit tilting of the housing 20 in a vertical plane and rotation of the housing about its cylindrical axis. The coupling between the tube housing 20 and the supporting yoke 21 is accomplished by means of supporting arms 70 and 71 which are movably disposed in the supporting yoke extremities for movement in a direction parallel to the axis of the shaft 25. The movable support for the tube housing 20 permits the tube assembly to be disconnected from the retaining ring 29 and moved away axially so that the shaft 25 and its retaining ring 29 can be withdrawn from the supporting and mounting yokes to condition the apparatus for independent manual positioning by an operator.

Figure 13:
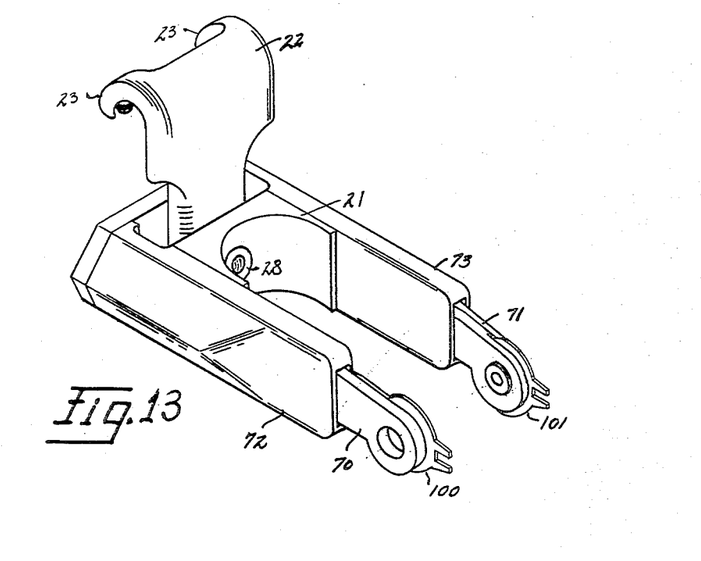
Fig. 13 is a perspective view of the tube head supporting and mounting yoke assembly.

The latter feature is best shown by reference to Fig. 13 of the drawings where the supporting arms 70 and 71 are shown as extending from hollow extremities 72 and 73 of the supporting yoke 21. Each arm is movably supported on rollers 74 within the corresponding hollow extremity of the supporting yoke to permit withdrawal of the supporting arms as an axial extension of the trunnion yoke support. As best shown in the partial sectional view of Fig. 14, a projection 75 is provided at the rearmost extremity of each supporting arm for engagement with spaced stops 76 and 77 which project inwardly within the hollow yoke extremities, thus limiting the extent of outward and inward movement of the corresponding supporting arm. Each supporting arm also carries a magnetically susceptible plate, one of which is shown at 80 in Fig. 14, for coaction as an armature with a locking magnet, shown at 81 as mounted adjacent the path of such armature within the hollow extremity 72 of the supporting yoke. Another armature 80A and locking magnet 81A coact between the arm 71 and the other hollow yoke extremity 73. The magnetic locks thus formed can be remotely controlled so that when energized they will positively lock the supporting arms 70 and 71 in any fixed position relative to the corresponding supporting yoke extremities in a manner which will be more fully described in connection with the circuit diagram of Fig. 21 of the drawings.

Figure 16:
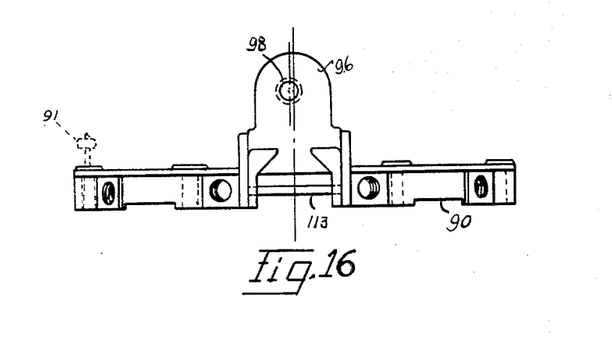
Figure 17:
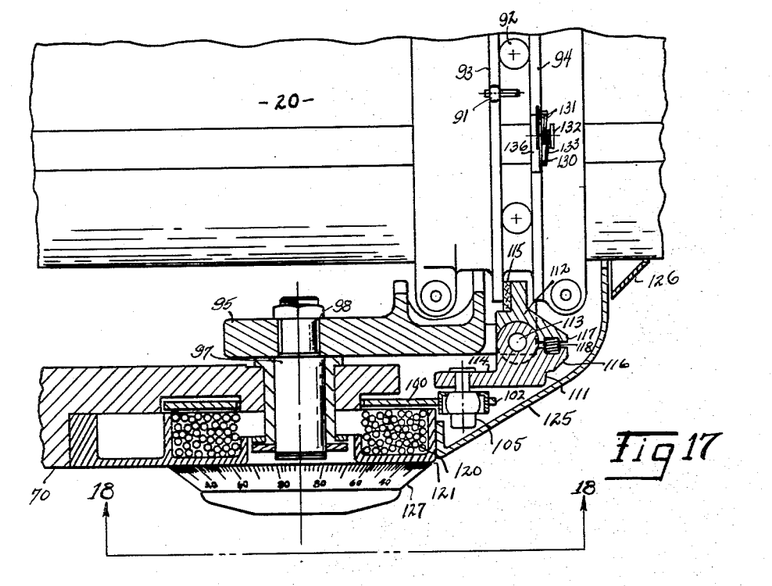
Fig. 17 is a partial sectional view taken along the lines 17—17 in Fig. 1 to show the rotation and tilt locks between the supporting yoke and the tube housing.

As hereinbefore noted, the tube housing 20 is independently supported for rotation in an annular collar 90 (Figs. 15 and 16) which encircles the housing and carries rollers 91 and 92 for engaging a guide track formed by suitable flanged guides 93 and 94 extending about the housing 20 intermediate its ends, as best shown in the partial sectional view of Fig. 17. The tube housing 20 is pivotally coupled to the extremities of the arms 70 and 71 through circumferentially spaced brackets 95 and 96 carried by the collar 90. Fig. 17 illustrates the trunnion coupling at one side of the tube housing as including a pivot stud 97 rotatably journaled on a traverse axis through the arm extremity 70 and extending through an aperture 98 in the corresponding bracket 95. Reference to Fig. 16 shows that the apertures through the bracket are offset slightly from the collar center line to lower the center of gravity of the tube housing relative to the tilt axis and thereby to provide a cradle-like support. This trunnion coupling is duplicated at the other side of the housing 20 and permits the housing and collar 90 to be tilted in a vertical plan about an axis transverse to the cylindrical axis of the housing.

Figure 14:
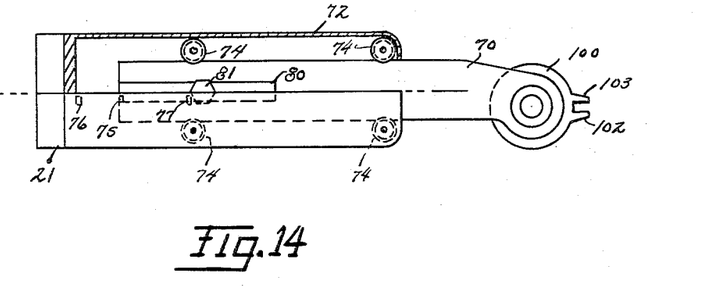
Fig. 14 illustrates in partial section the interior of one of the supporting yoke arms.
Figure 15:
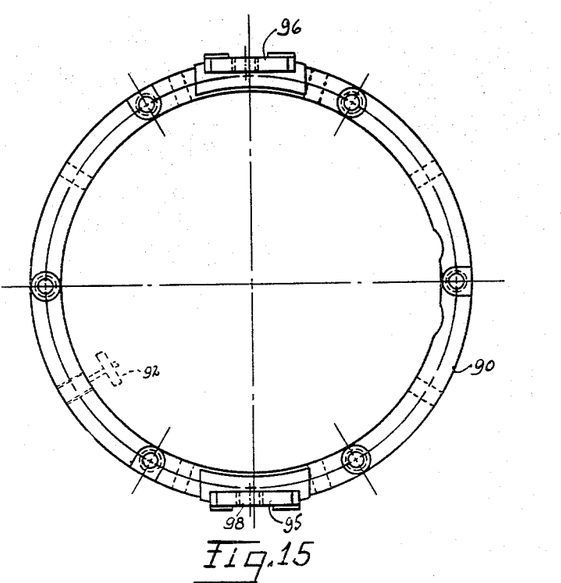
Figs. 15 and 16 are end and edge views of the supporting collar for the tube housing.

Further reference to Fig. 17 in conjunction with Figs. 13 and 14 illustrates mechanism for stopping and locking the housing 20 against rotation and tilting relative to the supporting yoke 21. This mechanism includes magnetically susceptible discs 100 and 101 which are journaled for free movement about the corresponding tilt axis on the extremity of each supporting arm 70 and 71. Each disc is provided with radially projecting and circumferentially spaced fingers 102 and 103 which, as shown in relation to one side of the housing 20 in Fig. 17, project on either side of and engage a ball-joint type of slide bearing 105 carried by a composite locking lever assembly 110. The locking lever assembly is composed of two members 111 and 112 which are journaled for rocking motion about a shaft 113 carried by the corresponding collar bracket. The member 112 has an extended lever portion 114 which carries the ball joint 105 in spaced relation from the rocking axis, and the member 111 carries a brake lining 115 adjacent one of the housing flanges 93 for engagement therewith when the lock lever assembly is rocked towards such flange. The members 111 and 112 have portions 116 and 117 which project in a direction opposite from the extended lever portion 114 and, when assembled, overlap and coact through a tension spring 118. The rocking motion is accomplished by mounting a coil 120 in a magnetic pole piece 121 carried by the corresponding supporting arm extremity adjacent its magnetically susceptible disc 100 so that, when energized, the coil 120 will attract the disc 100 and cause the projecting fingers 102 and 103 to tilt the lever portion 114 through the ball joint slide bearing 105. Tilting of the lever portion 114 will rock the lock lever assembly 110 about the shaft 113 and cause the brake lining 115 to engage the housing flange 93 and prevent rotation of the housing 20. At the same time, locking of the disc 100 against the magnetized pole piece 121 will prevent further tilting of the housing 20 in a vertical plane.

It will be understood that the coupling and locking mechanism is duplicated on the other side of the housing for coaction through a coil 120A and pole piece 121A with the disc 101. Thus, when the coils 120 and 120A are deenergized, the tube housing 20 may be rotated and tilted at will to any desired position in the supporting yoke 21 and then locked in a selected position by energizing the coils. When the tube housing assembly is to be coupled to the rotation arm 40 for driven rotational therapy, the coils 120 and 120A are deenergized and the tube housing 20 is tilted and rotated into alignment with the projected axis of the shaft 25 and with the bolts 31 on the retaining ring 29 and connected thereto. The coils then remain deenergized to permit the tube housing 20 to rotate freely within its supporting yoke 21 as the rotation arm 40 drives the entire assembly in its circular path.

Figures 18, 19:
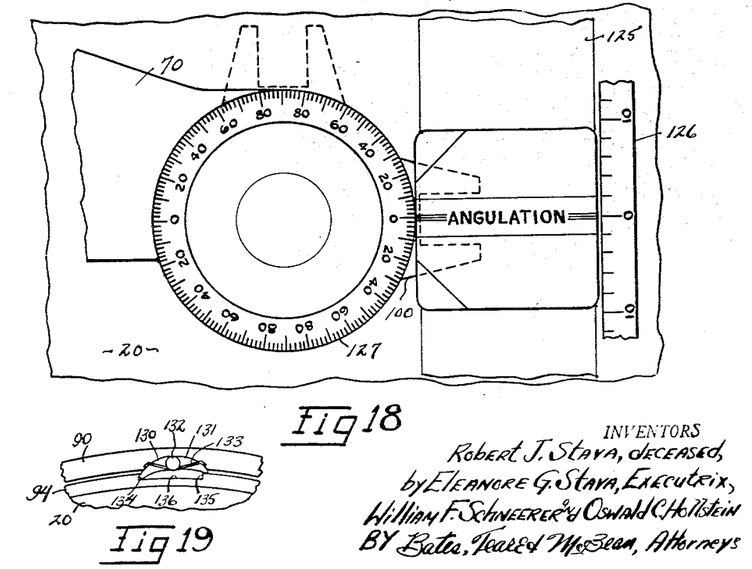
Fig. 18 is a partial view taken along the lines 18—18 in Fig. 17 to illustrate tilt and rotation angulation dial indicators.
Fig. 19 is a partial view of a limiting rotation stop for the tube housing.

The lock lever assembly 110 and the supporting collar 90 are preferably surrounded by a suitable housing cover 125 which encircles the tube housing 20 and suitable angulation dials 126 and 127 are provided to indicate the extent of rotation and vertical tilt respectively of the tube housing. The rotation angulation dial 126 is fixed about the tube housing 20 and the tilt angulation dial is fixed adjacent the tilt shaft axis on the external face of the extremity of the supporting arm 70, as best shown in Figs. 17 and 18 of the drawings.

Although it is desired that the tube housing 20 be capable of a full 360° rotation, it is not necessary that such rotation be continuously repetitive in the same direction. Accordingly, suitable rotation limit stops are provided to restrict the rotation to 360° in either direction. In the preferred embodiment, these stops take the form of a pair of cam rocker arms 130 and 131 pivoted on a pin 132 projecting from one side of the collar 90 as shown in the partial view of Fig. 19. These cam rocker arms are biased downwardly by a spring 133 for selective engagement with corresponding shoulders 134 and 135 respectively formed by a notched recess 136 in the tube housing flange 94. The disposition of the cam rocker arms relative to the flange recess 136 is also shown in Fig. 17 of the drawings to aid in understanding their locking coaction. Thus, when the tube housing is rotated through 360° in either direction, the respective cam rocker arms 130 or 131 will engage the corresponding shoulders 134 or 135 to restrict further rotation. The circumferential length of the recess 136 is selected to accommodate the circumferential thickness of the cam rocker assembly and permit a full 360° rotation in either direction.

Figure 20:
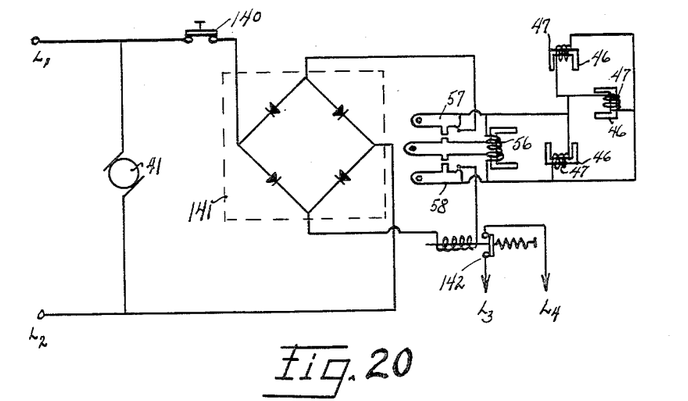
Fig. 20 is a schematic diagram of the electrical energizing circuit for the motor drive and magnetic clutches.

Referring now to Fig. 20 of the drawings, there is schematically shown a circuit diagram for energizing the motor drive and rotation arm clutch circuits as well as the synchronous operation of the X-ray exposure circuits. The drive motor 41 may be any type which will provide a variable speed drive and is shown connected directly across a supply line $L_1L_2$ which in turn may be coupled to a suitable source of alternating current electrical energy. The clutch coils 47 are also connected across this supply line through a push button switch 140, which is located on the front face of the tube housing 20, and a full-wave rectifier 141. The parallel circuit of magnetic clutch coils includes the coil for the protective magnet 56 which is pivoted on the rotation arm 40 for swinging engagement with one or the other of the normally closed limit switches 57 or 58 to deenergize the clutch coils and disengage the rotation arm from the drive in the event that the clutch slips. The same limit switches will deenergize an electromagnetically controlled switch 142 to open the X-ray exposure circuit at $L_3L_4$.

In addition to the magnet locks 81 and 81A, one of which is carried by each supporting arm 70 and 71 as shown in Figs. 13 and 14, and the magnetic locks formed by the coils 120 and 120A and the corresponding magnetically susceptible discs 100 and 101 on each supporting arm extremity, there are provided other magnetic locks for selectively stopping the movement of other operative elements of the apparatus. Thus, each tubular guide carriage 36 carries an electromagnetically energized lock 150 in the form of a coil and pole piece which when energized is capable of displacement towards locking engagement against the magnetically susceptible track 38 within the corresponding vertical frame support, one of which is shown in the sectional view of Fig. 7 of the drawings. It will be understood that, although not shown, another carriage 36A and track 38A coacts with a magnetic lock 150A in the other vertical frame support. The mounting yoke 22 also carries a pair of such magnetic locks for locking coaction against a magnetically susceptible track 152 disposed along the tubular guide 15, one of which is shown at 153A in Fig. 3 of the drawings. It is readily apparent that any or all relative movements of operative elements of the apparatus may be stopped by selectively energizing the corresponding magnetic locks.

Figure 21:
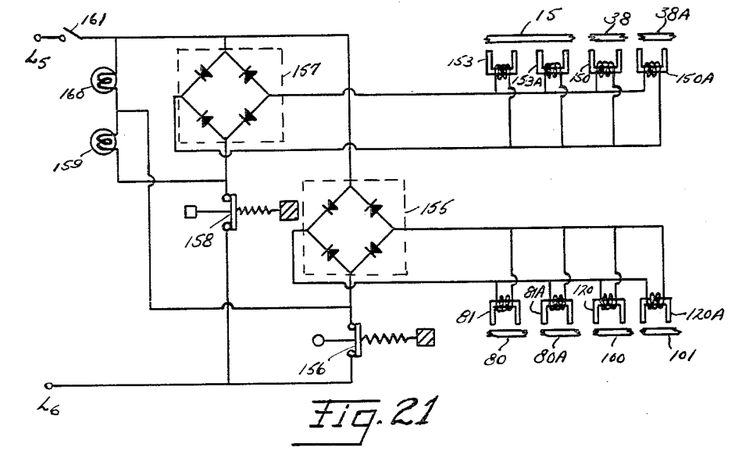
Fig. 21 is a schematic diagram of the electrical control circuit for the magnetic locks which control the various movements of the apparatus assembly.

Accordingly, Fig. 21 schematically illustrates a control circuit for selectively energizing the magnetic locks in a preferred manner whereby movement of the tube housing 20 relative to the supporting yoke 21 is controlled independently of the movement of the mounting yoke 22 and the tubular guides 15 and 16. In this circuit, the magnetic locks 81 and 81A for locking the supporting arms 70 and 71 and the magnetic locks formed by the coils 120 and 120A and the discs 100 and 101 for locking the tube housing 20 against rotation and tilting are connected in parallel across an alternating current supply $L_5L_6$ through a full-wave rectifier 155 and a normally closed manual switch 156. An independent branch circuit connects the tubular guide carriage locks 150 and 150A and the mounting yoke locks 153 and 153A in parallel across the same supply through another rectifier 157 and a normally closed manual switch 158. Suitable pilot lamps 159 and 160 are provided for each branch circuit to indicate that the corresponding locks are energized. Thus, each branch lock circuit can be independently energized, as for example when the tube housing 20 is to be manually positioned by an operator in a fixed location on the supporting frame relative to an object of examination or treatment. Likewise, both branch lock circuits can be deenergized simultaneously for driven rotation therapy by opening both the switches 156 and 158 after the desired starting position is attained, or by opening the line switch 161.

Thus, there has been provided a rotational therapy method and apparatus for simplifying X-ray treatment of tumors and the like by eliminating the necessity for checking and adjusting the apparatus during treatment. The method and apparatus permits a high degree of accuracy and safety in such treatment by restricting the X-ray absorption of surrounding healthy tissue to a predetermined tolerance dose without sacrificing the lethal dose required at the tumor. The apparatus is also capable of conventional X-ray treatment and analysis and includes safety features for protecting both the apparatus and the subject of examination or treatment.

There is shown and described what is considered to be the preferred embodiments of this invention, along with modified forms and suggestions, and it will be obvious to those skilled in the art that other changes may be made without departing from the scope of this invention as defined by the appended claims.

We claim:

1. An X-ray apparatus comprising in combination, a rectangular frame having parallel spaced side supports and a transverse guide therebetween movable along said side supports, a carriage mounted for free movement along said guide, an X-ray beam source coupled to the carriage for rotation on an axis normal to the plane of the frame and including means for directing the X-ray beam parallel to the plane of the frame and towards a fixed fulcrum within the confines of the frame, a crank arm mounted on the frame for rotation within the plane of the frame for rotation on an axis substantially coincident with the fulcrum, means for coupling the radial extremity of the crank arm to the X-ray beam source, and other means for rotating the crank arm to move the carriage along the guide and the guide along the side support while rotating the X-ray source, thereby rotating the X-ray beam in a circular path about the fulcrum in the plane of and within the confines of the frame.

2. In an X-ray apparatus the combination of, a vertically disposed frame, a mounting yoke having spaced side arms horizontally disposed normal to the plane of the frame and mounted on the frame for free horizontal and vertical movement in the vertical plane of the frame, means coacting therewith to counterbalance the vertical movement, a shaft mounted for rotation in the mounting yoke on an axis intermediate and parallel to the side arms, a housing having an X-ray tube disposed on a central axis through the housing and having an X-ray beam normal to the central axis, means for coupling the housing for rotation by the shaft with the shaft axis in alignment with the central axis of the housing, a crank arm mounted for rotation within the plane of the frame and about a fixed point on the frame, and means for coupling the radial extremity of the crank arm to the shaft to move the mounting yoke on a circular path in the plane of the frame while rotating the housing and X-ray tube to rotate the X-ray beam about a fulcrum substantially coincident with the fixed point on the frame.

3. An X-ray apparatus comprising in combination, a supporting frame including a pair of parallel spaced side members, a carriage guide disposed transversely between the side members and coupled for movement along such members, a carriage supported for movement along the guide, a source of X-radiation for providing a directed X-ray beam, means for mounting said X-ray source on the carriage for rotation on an axis normal to the plane of the supporting frame so that the X-ray beam may be directed at any angle in the plane of the frame and from any location within the confines of the frame.

4. An X-ray apparatus comprising in combination, a supporting frame including a pair of parallel spaced side members, a carriage guide disposed transversely between the side members and coupled for movement along such members, a carriage mounted for movement along the guide, a coupling member carried by the carriage, a source of X-radiation for providing a directed X-ray beam, means for supporting the X-ray source on the coupling member for relative rotation on an axis normal to the plane of the supporting frame, and pivotal means coacting between the X-ray source and the coupling to permit relative tilting movement about an axis parallel to the carriage guide, thereby permitting the X-ray beam to be directed at any angle parallel or transverse to the plane of the supporting frame and from any location within the confines of the frame.

5. The apparatus of claim 4 wherein said source of X-radiation includes a cylindrical housing, and said coupling member is in the form of a yoke having parallel spaced supporting arms projecting outwardly normal to the plane of the frame to form a trunnion cradle, and wherein said supporting means includes a collar in which the housing is rotatably seated, and wherein said pivotal means includes trunnions on said collar pivotally coupled in the trunnion cradle on an axis extending transversely through the supporting arm extremities.

6. In an X-ray apparatus of the type described having an X-ray beam source movably supported on a frame for rotation of the beam about a fixed object as a fulcrum, the combination comprising, a crank arm mounted at one end for rotation on an axis substantially coincident with the object fulcrum and having means for coupling the other end thereof to the source, a driven member operatively disposed for rotation on said axis adjacent said one end of the crank arm, and means for coupling the crank arm to said driven member for rotation therewith.

7. The apparatus of claim 6 wherein said driven member carries a magnetically susceptible armature in operative proximity to the adjacent end of the crank arm and wherein said adjacent end of the crank arm carries an electromagnetic device including an energizing coil and a pole piece adapted to be positioned for magnetic coaction against the armature when energized, whereby said crank arm and driven member rotate as a unit, and including means for energizing said coil.

8. The apparatus of claim 6 wherein said means for coupling the other end of the crank arm to the source includes a shaft disposed for rotation on an axis normal to the plane of travel of the crank arm, said shaft having an angular cross-section on the extremity adjacent the path of travel, and wherein said other end of the crank arm has a mating angular aperture adapted for alignment with the angular extremity of the shaft, the extremity of said other end of the crank arm being separable therefrom along a line intersecting the angular aperture to receive the angular shaft extremity therein, and latch means coacting between the separable extremity and the crank arm to secure them together about the angular extremity of the shaft.

9. In an X-ray apparatus of the type described having an X-ray beam source movably supported on a frame for rotation of the beam about a fixed object as a fulcrum the combination comprising, a crank arm mounted at one end for rotation on an axis substantially coincident with the object fulcrum and having means for coupling the other end to the X-ray beam source, a driven member operatively disposed for rotation on said axis adjacent said one end of the crank arm, means coacting therebetween to couple the crank arm to the driven member for rotation as a unit, a housing enclosing said driven member and having a portion thereof intersecting the circular path of said crank arm at a selected circumferential position, and means on said crank arm for engaging said intersecting portion of the housing to restrict further movement of the crank arm in the direction of movement.

10. The apparatus of claim 9 wherein said last-mentioned means includes a lever mounted on the crank arm for pivotal movement in the plane of crank arm travel, and a pair of projections spaced from each other and the lever on opposite sides of the lever in its pivotal path to limit the extent of its pivotal movement, the spacing between the lever and each projection corresponding to the structural dimension of the intersecting housing portion along the path of crank arm travel to permit the crank arm to make a complete rotation in each direction.

11. In an X-ray apparatus the combination of a supporting frame having a pair of parallel spaced vertical side members and a pair of parallel guide rods disposed horizontally between the side members in fixed vertical spaced relation from each other, a mounting yoke having a downwardly hooked extremity at its upper end adapted to overlie the upper guide rod and having its lower end terminating adjacent the lower guide rod, the hooked extremity and the lower end of said mounting yoke each carrying a roller for coaction against the respective guide rods to permit movement of the mounting yoke thereon, a supporting yoke having a body portion with spaced parallel side arms projecting outwardly therefrom to form a trunnion cradle for a source of X-radiation, and means for mounting the body of said supporting yoke on the mounting yoke with the side arms projecting horizontally normal to the vertical plane of the supporting frame.

12. The apparatus of claim 11 wherein said last-mentioned means includes a roller sleeve journalled in the mounting yoke for rotation on a horizontal axis disposed normal to the vertical plane of the supporting frame and wherein said supporting yoke body includes an aperture therethrough intermediate and parallel to the projecting side arms and adapted to seat on the roller sleeve, and including indexing means coacting between the supporting yoke body and the mounting yoke to lock the supporting yoke in selected rotated positions on the mounting yoke.

13. An X-ray apparatus comprising in combination, a mounting yoke having spaced side arms forming a trunnion cradle, a shaft carried by the yoke for rotation on an axis parallel to and intermediate the side arms, an X-ray tube housing having a rear wall adapted to receive electrical cables, said rear wall having a plurality of circumferentially spaced apertures, a collar encircling and supporting the housing for rotation on a central axis normal to the rear wall, said collar having trunnions pivotally coupled to the yoke side arms to permit tilting of the housing about an axis transverse to its central axis of rotation, a coupling member for connecting the rear wall of said housing to the shaft will the central axis of the housing in alignment therewith, said coupling member being keyed to the shaft and having a segmental retaining ring partially encircling the axis of rotation, said segmental ring having circumferentially spaced means adapted for alignment and engagement with the apertures in the rear housing wall, whereby the open segment of said ring will accommodate electrical cables passing through the rear wall of said housing.

14. In an X-ray apparatus of the type described a supporting yoke for an X-ray tube housing comprising in combination, a body portion having parallel side arms projecting outwardly from each side to form a trunnion cradle, each side arm being hollow and each having interior roller means spaced along their length to form a guide therein, a pair of elongated tube housing supporting arms each freely disposed within a respective roller guide for movement in the direction of their longitudinal axis relative to the corresponding hollow side arm, one end of each supporting arm projecting external to the corresponding side arm to form an extension thereof and having means forming a trunnion support for the tube housing therebetween, and means coacting between each side arm interior and the corresponding supporting arm to limit the relative movement therebetween.

15. The supporting yoke of claim 14 wherein said last-mentioned means includes a longitudinally disposed magnetically susceptible armature carried by each supporting arm and an electromagnet disposed in fixed relation within each hollow side arm adjacent the corresponding armature, each electromagnet and armature coacting to lock the corresponding supporting arms against relative movement upon energization of the electromagnets.

16. In an X-ray apparatus of the type described, the combination of a cylindrical X-ray tube housing, a U-shaped supporting yoke having parallel spaced supporting arms projecting outwardly and adapted to extend along opposite sides of the tube housing and parallel to its cylindrical axis, an annular collar encircling the cylindrical tube housing therein, said collar having a pair of fixed mounting brackets disposed at diametrically opposite sides thereof and each having a portion extending parallel to the housing axis and adapted for alignment respectively with the projected extremities of the yoke supporting means for pivotally coupling the extended portion of each bracket to the adjacent supporting arm extremity for rotation of the collar about an axis transverse to the cylindrical axis of said tube housing, and other means coacting between each supporting arm and the tube housing to restrict rotation of the collar and the tube housing about their respective axes.

17. In an X-ray apparatus of the type described, the combination of, an annular supporting collar, an X-ray tube housing freely supported in said collar for rotation on a central axis, said collar having diametrically spaced external trunnions, a yoke having parallel spaced arms forming a trunnion cradle for pivotally supporting the collar and housing assembly on an axis transverse to the central axis of rotation, each collar trunnion being pivotally supported in a corresponding yoke arm, means coacting with a yoke arm and the collar and housing assembly when activated to prevent rotation of the housing within the collar and pivotal movement of the collar and housing about the trunnion axis, and means for activating said rotation preventing means.

18. The apparatus of claim 17 wherein said last-mentioned means includes an electromagnet carried by the yoke arm and a movable lock lever carried by the collar, said lock lever having means operative in one position of the lever to lock the housing and collar in fixed position relative to the yoke arm, and an armature coupled to the lock lever for coaction with the electromagnet to selectively position the lock lever into said one position.

19. The apparatus of claim 17 wherein said last-mentioned means includes a lock lever pivotally mounted on the collar and having one extended lever portion adjacent the housing and another extended lever portion adjacent a yoke supporting arm, said extended lever portions being spaced from each other on opposite sides of the pivotal mounting, said one extended end portion carrying a brake lining adapted to engage the tube housing in one pivoted position to restrict rotation of the housing within the collar, and means coacting between the corresponding yoke supporting arm and the other extended lever portion to selectively tilt the lock lever into said one pivoted position.

20. The apparatus of claim 17 wherein said last-mentioned means includes a lock lever pivotally mounted on the collar and having one extended lever portion adjacent the housing and another extended lever portion adjacent a yoke supporting arm, said extended lever portions being spaced from each other on opposite sides of the pivotal mounting, said one extended lever portion carrying a brake lining adapted to engage the tube housing in one pivoted position to restrict rotation of the housing within the collar, a slide bearing carried by the other extended lever portion for relative movement along an axis transverse to the pivotal axis of the lock lever, said slide bearing having a ball joint including a sleeve encircling the bearing having a ball joint including a sleeve encircling the bearing axis and adapted for limited tilting movement relative to said bearing axis, an annular member freely surrounding the trunnion and having a pair of circumferentially spaced radial projections on its outer periphery engaging diametrically opposite sides of the ball joint sleeve, whereby said annular member will rotate about the trunnion with the lock lever and collar, and means for preventing rotation and causing axial displacement of said annular member, thereby preventing rotation of the collar and causing the lock lever to tilt through the slide bearing ball joint to position the brake lining against the tube housing.

21. In an X-ray apparatus the combination of, a cylindrical X-ray tube housing having a pair of axially spaced external flanges forming a guide track encircling the housing, an annular collar encircling the housing and overlying the guide track, and circumferentially spaced roller means carried by the collar for coaction with the guide track to permit rotation of the housing relative to the collar.

22. The apparatus of claim 21 wherein said roller means includes, a first set of circumferentially spaced rollers each freely mounted for rotation on a radial axis projecting inwardly from the collar, and a second set of circumferentially spaced rollers each freely mounted on an axis parallel to the axis of rotation, wherein said first set of roller tracks between the axially spaced flanges and said second set of roller tracks along the external periphery of at least one of said flanges.

23. In an X-ray apparatus of the type described the combination of an annular supporting collar, an X-ray tube housing freely supported in said collar for rotation on a central axis through the housing, and means coacting between the collar and the housing to restrict rotation of the housing in either direction beyond one complete revolution.

24. The apparatus of claim 23 wherein said means includes a pair of rocker arms each pivotally mounted in opposed relation on the collar and spring-pressed towards engagement with the external surface of the housing, said housing having a recess forming a pair of circumferentially spaced and opposed shoulders each adapted to engage a different one of said rocker arms respectively when the recess is positioned adjacent the rocker arm assembly, the spacing between the opposed recess shoulders being less than the circumferential distance between the rocker arm extremities.

25. In an X-ray apparatus having an electromagnetic clutch adapted for driving coaction between a driven member and a movable X-ray tube support the combination of, an X-ray tube energizing circuit including a switch, a clutch energizing circuit including electromagnetic means adapted to operate said switch to energize the X-ray tube circuit, a second switch in said clutch energizing circuit, and means operative consequent upon said X-ray tube support striking an obstruction to position said second switch to deenergize the clutch circuit and the electromagnetic means.

26. In an X-ray apparatus the combination comprising, a vertical frame support having a carriage mounted for vertical and horizontal movement thereon, electromagnetic means coacting between the carriage and the frame support when energized to restrict carriage movement, an energizing circuit for said electromagnetic means including an operating switch, an X-ray tube housing supporting yoke carried by the carriage and having relatively movable extensible tube supporting arms, a second electromagnetic means coacting between the arms and the yoke to restrict relative movement therebetween, means for movably supporting an X-ray tube housing on said arms, and a third electromagnetic means coacting between the tube housing and the arms to restrict relative movement therebetween, a second energizing circuit for said second and third electromagnetic means including an operating switch, and means for connecting each of said energizing circuits to a source of electrical energy.

27. In an X-ray apparatus having a rectangular supporting frame with spaced parallel side supports having spaced parallel transverse guides therebetween and movable as a unit along the side supports, the method of moving an X-ray beam in a circular path within the plane of the supporting frame consisting of, mounting an X-ray beam source for rotation on an axis normal to the plane of the supporting frame, directing the X-ray beam parallel to the plane of the frame and towards a fulcrum within the confines of the frame, coupling the X-ray source mounting for unitary movement with the rotation axis along the transverse guides, then moving the mounting along the guides and the guides along the frame side supports to move the X-ray source in a circular path in the plane of and within the confines of the frame, and simultaneously rotating the X-ray source to maintain the direction of the X-ray beam towards the fulcrum of the circular path.

28. An electro-magnetic clutch comprising in combination, a pair of members mounted for free rotation in axially spaced relation on a common axis, one of said members being driven and having a continuous magnetically susceptible face adjacent the other member, said other member carrying a plurality of circumferentially spaced electro-magnets, means for energizing said electro-magnets to be attracted into engagement with the magnetically susceptible face of the driven member for rotation therewith, and other means operative in response to angular displacement between said members during rotation to de-energize and disengage said electro-magnets from the magnetically susceptible face of the driven member.

29. The clutch of claim 28 wherein said last mentioned means includes a pair of switches mounted in circumferentially spaced relation on the clutch face of said other member, and another electro-magnet adapted to be energized by said energizing means, an arm supporting said last mentioned electro-magnet at one end and having a rigid projection at its other end pivotally mounted on the clutch face of said other member intermediate said spaced switches, said arm adapted to swing about the pivot into engagement with either switch to open the energizing connection consequent upon said other member engaging an obstruction in the path of rotation.

30. Radiation therapy means adapted for irradiation of a circumscribed area comprising a source of radiation provided with an exit opening through which a beam produced at a source point emanates, a first means for shifting said source of radiation substantially in a straight line in one direction, a first power operated means for producing said shifting movement, including a second means for shifting said source of radiation substantially in a straight line in a direction at an angle with respect to the direction in which its source is shifted by the said first means, including a second power operated means for producing the shifting by said second means, a third means for producing a rotation of the source of radiation around a center substantially coincident with the source point of the radiation, including a third power operated means producing said rotational movement, means for coordinating the speed of the three power operated means, the coordination of the first and the second means for shifting the source of radiation producing a preselected curved path of the said source of radiation around the circumscribed area to be irradiated, while the coordination of the third power operated means with the two other power operated means directs the rays emanating through the exit opening towards the circumscribed area to be irradiated during the movement produced by the two first named means.

31. Radiation therapy means adapted for irradition of a circumscribed area comprising a source of radiation radiating from a source point through an exit opening, means for supporting said source of radiation rotatably with the axis of rotation passing through the source point or radiation and means for rotating the source of radiation, power operated means adapted to move in two opposite directions and oscillating said source of radiation around the axis of rotation, means for moving said supporting means for the source of radiation in a straight line, said means including a second power operated means, further means for imparting a rectilinear translatory movement to the means for moving the supporting means in a straight line, said further means including a third power operated means, and means for coordinating the speed of movement of the three power operated means in order to produce a reciprocating movement in a curve around the circumscribed area to be irradiated while simultaneously the source of radiation performs an oscillatory movement keeping the exit opening of the source of radiation pointed to the circumscribed area to be irradiated.

32. Radiation therapy means as claimed in claim 31 wherein the source of radition is supported by a supporting platform, comprising means for moving said supporting platform in a direction at right angles to the directions of movement in which the source of radiation is shifted by the two rectilinear movement producing means.

33. Radiation therapy means as claimed in claim 31 wherein the means for supporting the source of radiation include spaced vertical columns carrying vertically slidable slide members and horizontal slide rods attached to said slide members.

34. Radiation therapy means as claimed in claim 33, wherein the oscillatory movement around the circumscribed area to be irradiated is produced by means for moving the supporting means of the source of radiation simultaneously along the said horizontal slide rods and means for moving the vertically slidable slide members along the vertical columns.

References Cited in the file of this patent

UNITED STATES PATENTS

| | | |
|---|---|---|
| 1,233,122 | Pohl | July 10, 1917 |
| 1,491,426 | Schunemann | Apr. 22, 1924 |
| 1,887,216 | Reynolds | Nov. 8, 1932 |
| 2,235,143 | Colcher | Mar. 18, 1941 |
| 2,242,518 | Fodor | May 20, 1941 |
| 2,441,538 | Steinhaus | May 11, 1948 |
| 2,513,915 | Caldwell | July 4, 1950 |
| 2,556,909 | Feibel et al. | June 12, 1951 |
| 2,582,776 | Greenberg et al. | Jan. 15, 1952 |
| 2,673,627 | Stava et al. | Mar. 30, 1954 |
| 2,793,296 | Peterson | May 21, 1957 |